(12) United States Patent
Arik et al.

(10) Patent No.: US 12,106,223 B2
(45) Date of Patent: Oct. 1, 2024

(54) DATA VALUATION USING REINFORCEMENT LEARNING

(71) Applicant: Google LLC, Mountain View, CA (US)

(72) Inventors: Sercan Omer Arik, San Francisco, CA (US); Jinsung Yoon, San Jose, CA (US); Tomas Pfister, Foster City, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/333,301

(22) Filed: Jun. 12, 2023

(65) Prior Publication Data

US 2023/0325675 A1 Oct. 12, 2023

Related U.S. Application Data

(63) Continuation of application No. 17/026,145, filed on Sep. 18, 2020, now Pat. No. 11,823,058.

(60) Provisional application No. 62/903,448, filed on Sep. 20, 2019.

(51) Int. Cl.
| | |
|---|---|
| *G06N 3/04* | (2023.01) |
| *G06F 17/16* | (2006.01) |
| *G06N 3/047* | (2023.01) |
| *G06N 3/08* | (2023.01) |
| *G06N 3/084* | (2023.01) |
| *G06N 3/092* | (2023.01) |

(52) U.S. Cl.
CPC ............ *G06N 3/084* (2013.01); *G06F 17/16* (2013.01); *G06N 3/047* (2023.01); *G06N 3/08* (2013.01); *G06N 3/092* (2023.01)

(58) Field of Classification Search
None
See application file for complete search history.

(56) References Cited

U.S. PATENT DOCUMENTS 9,390,112 B1 * 7/2016 Daly ................... G06F 16/2358

OTHER PUBLICATIONS

Intellectual Property India. Examination Report relating to application No. 202247022028, dated Aug. 22, 2022.
(Continued)

*Primary Examiner* — Hal Schnee
(74) *Attorney, Agent, or Firm* — DORITY & MANNING P.A.

(57) ABSTRACT

A method includes obtaining a batch of training samples. For each particular training sample in the batch of training samples, the method includes generating, using a data value estimator model and the particular training sample, a corresponding predicted value of the particular training sample when used to train a machine learning model. The method includes selecting, based on the corresponding predicted values, a subset of the batch of training samples. For each particular training sample in the subset of the batch of training samples, the method includes determining, using the machine learning model and the particular training sample, a corresponding prediction performance measurement. The method includes adjusting one or more estimator parameter values of the data value estimator model based on the corresponding prediction performance measurements.

20 Claims, 6 Drawing Sheets

(56) References Cited

OTHER PUBLICATIONS

Jiangchao yao et al: "Deep Learning from Noisy Image Labels with Quality Embedding", Cornell University, arXiv:1711.00583v1 [cs.CV] Nov. 2, 2017, retrieved from URL: https://arxiv.org/pdf/1711.00583.pdf <https://protect-us.mimecast.com/s/MAJaCo2A6RcDV3nZf19vck?domain=arxiv.org>.

* cited by examiner

Algorithm 1 Pseudo-code of DVRL training

1: Inputs: Learning rates $\alpha, \beta > 0$, mini-batch size $B_p, B_s > 0$, inner iteration count $N_I > 0$, moving average window $T > 0$, training dataset $\mathcal{D}$, validation dataset $\mathcal{D}^v = \{(\mathbf{x}_k^v, y_k^v)\}_{k=1}^L$
2: Initialize parameters $\theta, \phi$, moving average $\delta = 0$
3: while until convergence do
4:     Sample a mini-batch from the entire training dataset: $\mathcal{D}_B \equiv (\mathbf{x}_j, y_j)_{j=1}^{B_s} \sim \mathcal{D}$
5:     for $j = 1, ..., B_s$ do
6:         Calculate selection probabilities: $w_j = h_\phi(\mathbf{x}_j, y_j)$
7:         Sample selection vector: $s_j \sim Ber(w_j)$
8:     for $t = 1, ..., N_I$ do
9:         Sample a mini-batch $(\tilde{\mathbf{x}}_m, \tilde{y}_m, \tilde{s}_m)_{m=1}^{B_p} \sim (\mathbf{x}_j, y_j, s_j)_{j=1}^{B_s}$
10:        Update the predictor model network parameters $\theta$ $$\theta \leftarrow \theta - \alpha \frac{1}{B_p} \sum_{m=1}^{B_p} \tilde{s}_m \cdot \nabla_\theta \mathcal{L}_f(f_\theta(\tilde{\mathbf{x}}_m), \tilde{y}_m))$$

11:     Update the data value estimator model network parameters $\phi$ $$\phi \leftarrow \phi - \beta \big[ \big[\frac{1}{L}\sum_{k=1}^{L} [\mathcal{L}_h(f_\theta(\mathbf{x}_k^v), y_k^v)] - \delta\big] \nabla_\phi \log \pi_\phi(\mathcal{D}_B, (s_1, ..., s_{B_s}))$$

12:     Update the moving average baseline $(\delta)$: $\delta \leftarrow \frac{T-1}{T}\delta + \frac{1}{LT}\sum_{k=1}^{L}[\mathcal{L}_h(f_\theta(\mathbf{x}_k^v), y_k^v)]$

FIG. 4

DATA VALUATION USING REINFORCEMENT LEARNING

CROSS REFERENCE TO RELATED APPLICATIONS

This U.S. patent application is a continuation of, and claims priority under 35 U.S.C. § 120 from, U.S. patent application Ser. No. 17/026,145, filed on Sep. 18, 2020, which claims priority under 35 U.S.C. § 119(e) to U.S. Provisional Application 62/903,448, filed on Sep. 20, 2019. The disclosure of this prior application is considered part of the disclosure of this application and is hereby incorporated by reference in its entirety.

TECHNICAL FIELD

This disclosure relates to data valuations using reinforcement learning.

BACKGROUND

Machine learning models receive an input and generate an output, e.g., a predicted output, based on the received input. Machine learning models are trained on data. However, quantifying the value of data is a fundamental problem in machine learning. Machine learning models are generally improved when trained on large-scale and high-quality datasets. However, collecting such large-scale and high-quality datasets can be costly and challenging. Moreover, there is the additional complexity of determining the samples in a large-scale dataset that are most useful for training and labeling accordingly. Real-world training datasets commonly contain incorrect labels, or the input samples differ in relatedness, sample quality, or usefulness for the target task.

Accurately quantifying the value of data improves model performance for training datasets. Instead of treating all data samples equally, lower priority may be assigned for a datum to obtain a higher-performance model when the value of the datum is low. Typically, quantifying data valuation performance requires individually removing samples to calculate performance loss and then assigning the loss as that sample's data. However, these methods scale linearly with the number of training samples, making it cost prohibitive for large-scale datasets and complex models. Besides building insights about the problem, data valuation has diverse use-cases, such as in domain adaptation, corrupted sample discovery, and robust learning.

SUMMARY

One aspect of the disclosure provides a method for valuating training samples. The method includes obtaining, at data processing hardware, a set of training samples. During each of a plurality of training iterations, the method also includes, sampling, by the data processing hardware, a batch of training samples from the set of training samples. The method includes, for each training sample in the batch of training samples, determining, by the data processing hardware, using a data value estimator, a selection probability. The selection probability for the training sample is based on estimator parameter values of the data value estimator. The method also includes selecting, by the data processing hardware, based on the selection probabilities of each training sample, a subset of training samples from the batch of training samples, and determining, by the data processing hardware, using a predictor model with the subset of training samples, performance measurements. The method also includes adjusting, by the data processing hardware, model parameter values of the predictor model based on the performance measurements, and updating, by the data processing hardware, the estimator parameter values of the data value estimator based on the performance measurements.

Implementations of the disclosure may include one or more of the following optional features. In some implementations, determining the performance measurements using the predictor model includes determining loss data by a loss function. In these implementations, adjusting the model parameter values of the predictor model based on the performance measurements includes adjusting the model parameter values of the predictor model based on the loss data. Additionally, in some implementations, updating the estimator parameter values of the data value estimator based on the performance measurements includes determining, from the loss data, a reinforcement signal, and updating estimator parameter values of the data value estimator based on the reinforcement signal. Updating the estimator parameter values of the data value estimator based on the reinforcement signal further includes determining a reward value based on the loss data, and updating the estimator parameter values of the data value estimator based on the reward value. In these implementations, determining the reward value based on the loss data includes determining a moving average of loss data based on N-most recent training iterations of the predictor model, determining a difference between the loss data for a most recent training iteration and the moving average of loss data, and determining the reward value based on the difference between the loss data for the most recent training iteration and the moving average of loss data.

In some examples, the data value estimator includes a neural network and updating estimator parameter values of the data value estimator includes updating layer parameter values of the neural network of the data value estimator. In some examples, the predictor model is trained using a stochastic gradient descent. In some implementations, selecting, based on the selection probabilities of each training sample, the subset of training samples from the batch of training samples includes, for each training sample in the batch of training samples, determining a corresponding selection value indicating selection or no selection. When the corresponding selection value indicates selection, the method includes adding the training sample into the subset of training samples, and when the corresponding selection value indicates no selection, the method further includes discarding the training sample. In some examples, sampling the batch of training samples includes sampling a different batch of training samples from the set of training samples for each of the plurality of training iterations.

Another aspect of the disclosure provides a system for valuating training samples. The system includes data processing hardware and memory hardware in communication with the data processing hardware. The memory hardware stores instructions that when executed by the data processing hardware cause the data processing hardware to perform operations that include obtaining a set of training samples. During each of a plurality of training iterations, the operations also include, sampling a batch of training samples from the set of training samples. The operations further includes for each training sample in the batch of training samples, determining, using a data value estimator, a selection probability. The selection probability for the training sample is based on estimator parameter values of the data value estimator. The operations also include selecting, based on the selection probabilities of each training sample, a subset of training samples from the batch of training samples, and determining, using a predictor model with the subset of training samples, performance measurements. The operations also include adjusting model parameter values of the predictor model based on the performance measurements, and updating the estimator parameter values of the data value estimator based on the performance measurements.

This aspect may include one or more of the following optional features. In some implementations, determining the performance measurements using the predictor model includes determining loss data by a loss function. In these implementations, adjusting the model parameter values of the predictor model based on the performance measurements includes adjusting the model parameter values of the predictor model based on the loss data. Additionally, in some implementations, updating the estimator parameter values of the data value estimator based on the performance measurements includes determining, from the loss data, a reinforcement signal, and updating estimator parameter values of the data value estimator based on the reinforcement signal. Updating the estimator parameter values of the data value estimator based on the reinforcement signal further includes determining a reward value based on the loss data, and updating the estimator parameter values of the data value estimator based on the reward value. In these implementations, determining the reward value based on the loss data includes determining a moving average of loss data based on N-most recent training iterations of the predictor model, determining a difference between the loss data for a most recent training iteration and the moving average of loss data, and determining the reward value based on the difference between the loss data for the most recent training iteration and the moving average of loss data.

In some examples, the data value estimator includes a neural network and updating estimator parameter values of the data value estimator includes updating layer parameter values of the neural network of the data value estimator. In some examples, the predictor model is trained using a stochastic gradient descent. In some implementations, selecting, based on the selection probabilities of each training sample, the subset of training samples from the batch of training samples includes, for each training sample in the batch of training samples, determining a corresponding selection value indicating selection or no selection. When the corresponding selection value indicates selection, the operations further include adding the training sample into the subset of training samples, and when the corresponding selection value indicates no selection, the operations further include discarding the training sample. In some examples, sampling the batch of training samples includes sampling a different batch of training samples from the set of training samples for each of the plurality of training iterations.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 4 is a schematic view of an algorithm for training a model for data valuations.

Like reference symbols in the various drawings indicate like elements.

DETAILED DESCRIPTION

Training deep neural networks to be highly accurate in predictions generally requires large quantities of training data. However, collecting large-scale and high-quality real world datasets is costly and challenging. Additionally, accurately training neural networks can take a significant amount of time and computational overhead. Accurately quantifying the value of training data has the significant potential of improving model performance for real-word training datasets which often contain incorrect labels or differ in quality and usefulness. Rather than treating all data samples in a training dataset equally, lower priority can be assigned to samples with lower quality to obtain a higher performance model. In addition to improving performance, data valuation may help develop better practices for data collection. However, historically data valuation has been limited by computational costs, as the methods scale linearly with the number of training samples in the dataset.

Implementations herein are directed toward data valuation using reinforcement learning (DVRL), which is a meta learning framework to adaptively learn data values jointly with the training of a predictor model. A data value estimator function, modeled by a deep neural network, outputs a likelihood a training sample will be used in training of the predictor model. Training of the data value estimator is based on a reinforcement signal using a reward directly obtained from performance on a target task. With a small validation set, DVRL can provide computationally efficient and high quality ranking of data values for training datasets that save both time and outperform other methods. The DVRL can be used in various applications across multiple types of datasets.

Figure 1:
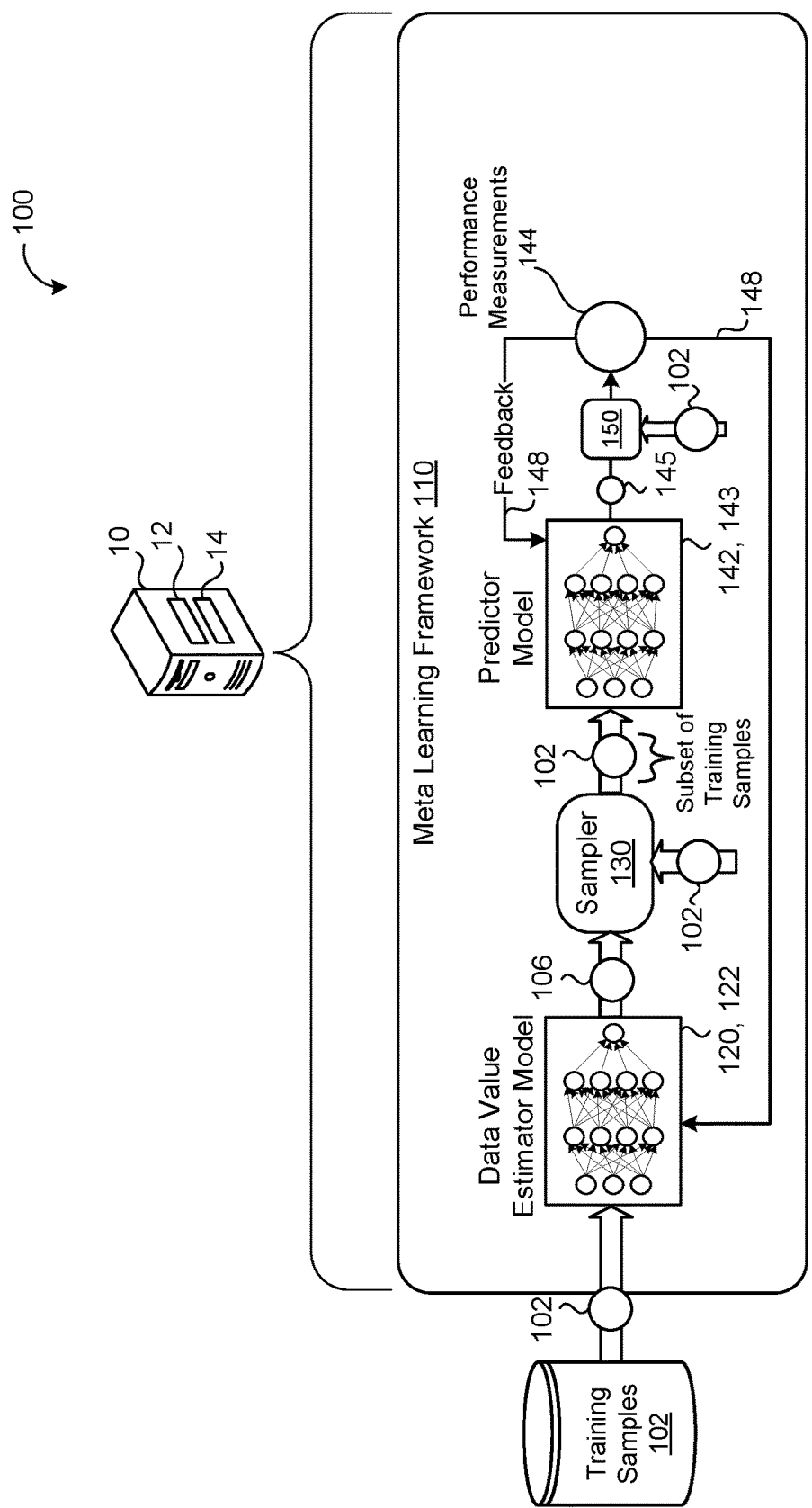
FIG. 1 is a schematic view of an example system for performing data valuations.

Referring to FIG. 1, in some implementations, an example system 100 includes a processing system 10. The processing system 10 may be a single computer, multiple computers, or a distributed system (e.g., a cloud environment) having fixed or scalable/elastic computing resources 12 (e.g., data processing hardware) and/or storage resources 14 (e.g., memory hardware). The processing system 10 executes a meta learning framework 110 (also referred to herein as a DVLR framework or just DVLR). The DVLR framework 110 obtains a set of training samples 102. Each training sample includes training data and a label for the training data. The label includes annotations or other indications of a correct result for a prediction based on the training data. In contrast, unlabeled training samples only include the training data without the corresponding label.

For example, the training samples 102 may include tabular datasets, audio datasets (e.g., for transcription or speech recognition, etc.), image datasets (e.g., for object detection or classification, etc.), and/or text datasets (e.g., for natural language classification, text translation, etc.). The set of training samples 102 may be stored in the processing system 10 (e.g., within memory hardware 14) or received, via a network or other communication channel, from another entity. The data value estimator 120 may select training samples 102 from the set of training samples 102 in batches (i.e., a select or random portion of the set of training samples 102). In some examples, the data value estimator 120 samples a batch of training samples 102 (i.e., a different batch for each iteration of the training).

The DVLR framework 110 includes a data value estimator model 120 (e.g., a machine learning model). In some implementations, the data value estimator model 120 is a neural network. The data value estimator model 120, for each training sample 102 in the batch of training samples 102, determines a selection probability 106 based on estimator parameter values 122 of the data value estimator model 120. The selection probability 106 represents a prediction of how valuable each training sample 102 in the batch of the training samples 102 will be to the predictor model 142. In some examples, the data value estimator model 120 determines the values of the input training samples 102 by quantifying the relevancy of the input training samples 102 to a predictor model 142.

The DVLR framework 110 includes a sampler 130. The sampler 130 receives, as an input, the selection probabilities 106 determined by the data value estimator model 120 for each training sample 102 in the batch. The sampler 130 selects, based on the selection probabilities 106 of each training sample 102, a subset of training samples 102 to provide to the predictor model 142. As discussed in more detail below, the sampler 130 may discard, based on the selection probabilities 106, the remaining training samples 102 in the batch of training samples 102. In some implementations, the selection probabilities 106 provided as input to the sampler 130 are based on a multinomial distribution.

The predictor model 142 (e.g., a machine learning model) receives the subset of training samples 102 sampled by the sampler 130. The predictor model 142 determines performance measurements 144 based on the subset of training samples 102 sampled from the batch of input training samples 102 selected for the current training iteration. The predictor model 142 is trained only with the subset of training samples 102 sampled by the sampler 130. That is, in some implementations, the predictor model 142 is not trained on the training samples 102 that are not selected or sampled by the sampler 130.

The predictor model 142 includes model parameter values 143 that control the prediction capabilities of the predictor model 142. The predictor model 142 makes predictions 145 based on the input training samples 102. A performance evaluator 150 receives the predictions 145 and determines, based on the predictions 145 and the training sample 102 (i.e., the label associated with the training sample 102) performance measurements 144 (e.g., an accuracy of the prediction 145). In some implementations, the performance measurements 144 includes loss data (e.g., cross-entropy loss data). In these implementations, the DVLR framework 110 determines a reinforcement signal based on the loss data. Optionally, the DVLR framework 110 may generate a reward value 230 (FIG. 2) based on the performance measurements 144.

The DVLR framework 110 adjusts and/or updates the model parameter values 143 of the predictor model 142 and the estimator parameter values 122 of the data value estimator model 120 based on the performance measurements 144. During each training iteration of a plurality of training iterations, the DVLR 110 may use a feedback loop 148 (e.g., back-propagation) to adjust the model parameter values 143 of the predictor model 142 based on the performance measurements 144 of the training iteration. The DVLR 110 may adjust, using the performance measurements 144 of the training iteration, the estimator parameter values 122 of the data value estimator model 120 based on the same or a different feedback loop 148. In some implementations, the DVLR framework 110 updates the estimator parameter values 122 of the data value estimator model 120 by updating layer parameter values of a neural network of the data value estimator 120.

Figure 2:
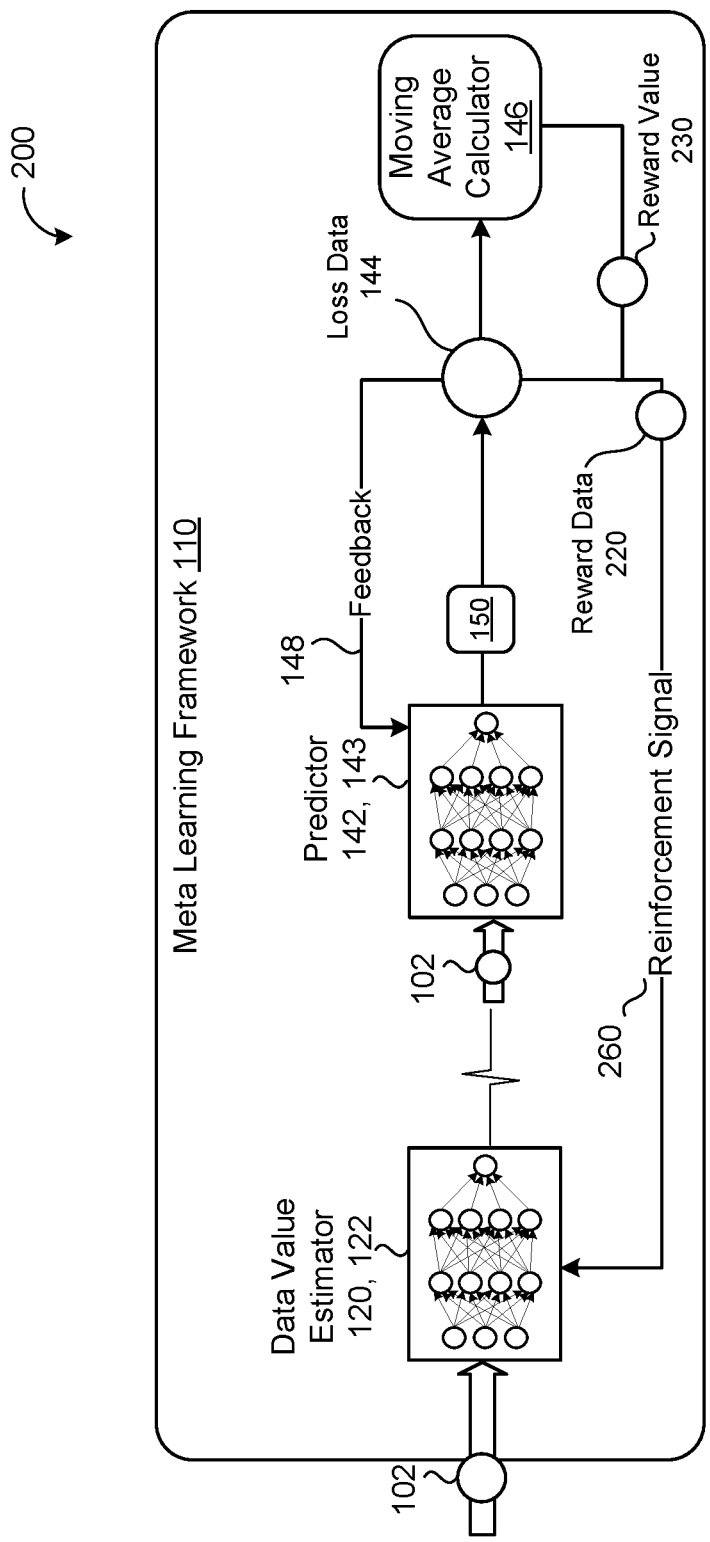
FIG. 2 is a schematic view of example components of the system of FIG. 1.

Referring now to FIG. 2, a schematic view 200 includes the DVLR 110 with a reinforcement signal 260 and the feedback loop 148. The performance measurements 144 may include loss data. The DVRL framework 110 may determine the loss data 144 using a loss function based on the subset of training samples 102 input to the predictor model 142. In some examples, the DVRL framework 110 trains the predictor model 142 using a stochastic gradient descent optimization algorithm with a loss function (e.g., mean squared error (MSE) for regression or cross entropy for classification). When the performance evaluator 150 determines the loss data 144 based on the loss function, the DVLR 110 updates the model values parameter 143 of the predictor model 142 with the performance measurements 144 (e.g., loss data 144) using the feedback loop 148.

After the DVRL framework 110 determines the loss data 144 for the training iteration, the DVLR 110 may generate a reinforcement signal 260. In some implementations, the DVRL framework 110 updates the estimator parameter values 122 of the data value estimator model 120 based on the reinforcement signal 260. The reinforcement signal 260 may also include reward data 220. The performance evaluator 150 may determine the reward data 220 by quantifying the performance measurements 144. For example, when the performance measurements 144 indicate low loss data 144 (i.e., minimal error or an accurate prediction) from the subset of training samples 102 received by the predictor model 142, the reward data 220 may reinforce the estimator parameters values 122 of the data value estimator model 120. Conversely, when the performance measurements 144 indicate high loss data 144 (i.e., high error) from the subset of training samples 102 received by the predictor model 142, the reward data 220 may indicate that the estimator parameter values 122 of the data value estimator model 120 need further updating.

In some implementations, the performance evaluator 150 calculates reward data 220 based on historical loss data. For example, the performance evaluator 150 determines, using a moving average calculator 146, a moving average of loss data based on N-most recent training iterations of the predictor model 142. In other words, for each training iteration, the moving average calculator 146 may obtain the loss data 144 and determine the difference between the current training iteration loss data 144 and the average of the N-most recent training iterations of loss data. The DVLR 110 may generate a reward value 230 based on the moving average of loss data determined by the moving average calculator 146. The reward value 230 may be based on the difference between the current training iteration loss data 144 and the average of the N-most recent training iterations of loss data. In some implementations, the DVRL framework 110 adds the reward value 230 to the reward data 220 of the reinforcement signal 260. In other implementations, the DVRL framework 110 merely uses the reward value 230 to influence the reward data 220 by increasing or decreasing the reward data 220 of the reinforcement signal 260.

Figure 3:
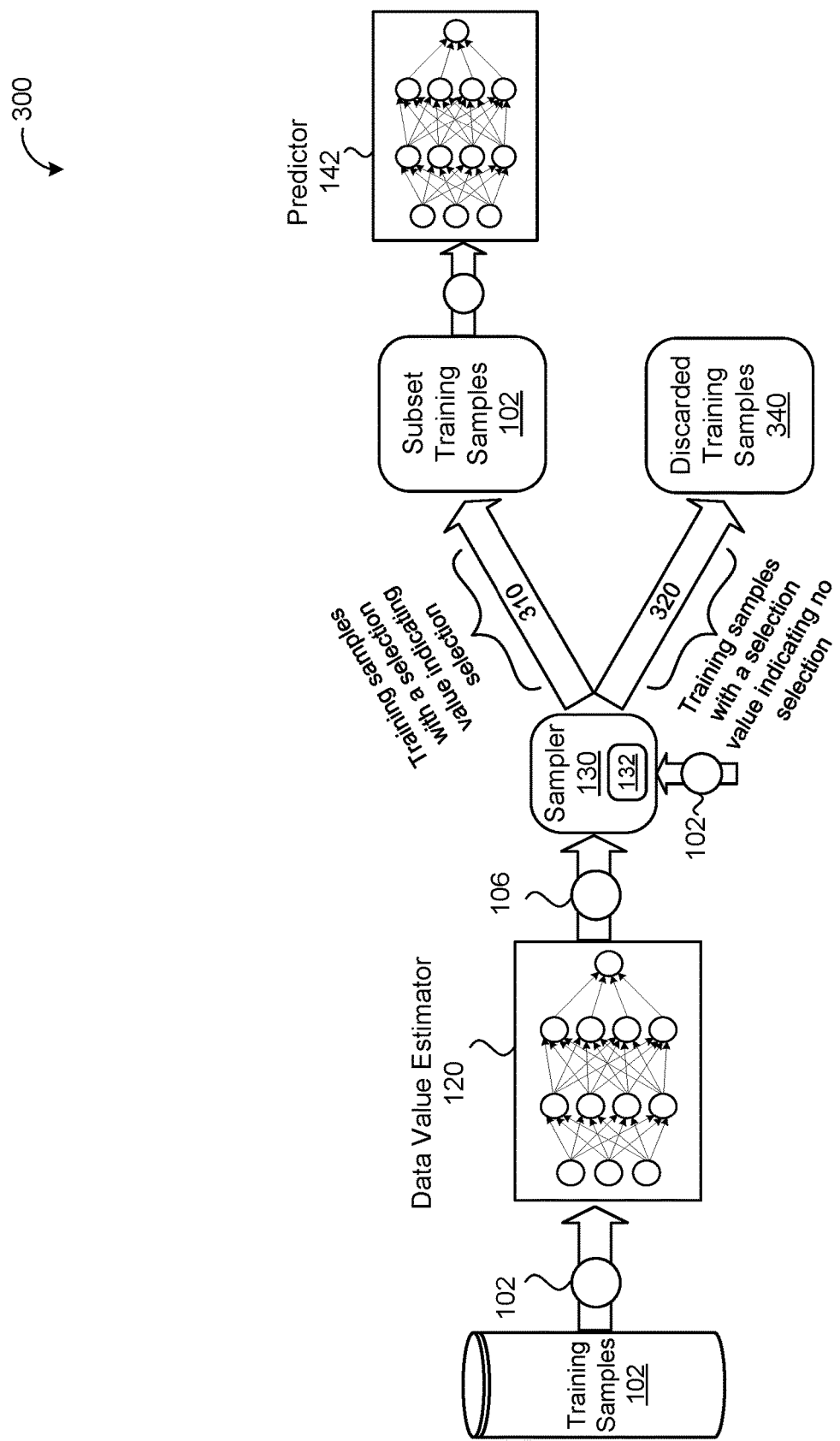
FIG. 3 is a schematic view of additional example components of the system of FIG. 1.

Referring now to FIG. 3, a schematic view 300 includes the DVLR 110 selecting the subset of training samples 102. In some implementations, the DVLR 110 selects the training samples 102 in the batch of training samples 102 for the subset of training samples 102 by determining a selection value 132 for each training sample 102. The selection value 132 may indicate selection or no selection for the corresponding training sample 102. The sampler 130, after the data value estimator model 120 generates the selection probabilities 106 for each of the training samples 102 in the batch of training samples 102, determines the corresponding selection value 132 indicating either selection 310 or no selection 320. Optionally, the selection probabilities 106 generated by the data value estimator model 120 conform to a multinomial distribution. The sampler 130 obtains the distribution of selection probabilities 106 and corresponding training samples 102 of the batch of training samples 102 and determines the selection values 132 by determining a likelihood that each training sample 102 in the batch of training samples 102 will train the predictor model 142.

When the sampler 130 determines that the selection value 132 of the training sample 102 indicates selection 310, the sampler 130 adds the training sample 102 to the subset of training samples 102. Conversely, when the sampler 130 determines that the selection value of the training sample 102 indicates no selection 320, the sampler 130 may discard the training sample 102 (e.g., to discarded training samples 340). In some implementations, the DVLR framework 110 returns the discarded training samples 340 back to the set of training samples 102 for future training iterations. In other implementations, the DVRL framework 110 isolates the discarded training samples 340 (i.e., removed from the set of training samples 102) to prevent inclusion in future training iterations.

Referring now to FIG. 4, in some implementations, the DVLR 110 implements an algorithm 400 to train the data value estimator 120 and the predictor model 142. Here, the DVLR 110 accepts the set of training samples 102 (i.e., D), and initializes the estimator parameter values of the data value estimator model 120, the model parameter values of the predictor model 142, and resets the moving average loss in the moving average loss calculator 146. The DVLR 110, for each training iteration, until convergence, samples a batch of training samples 102 (i.e., mini-batch B) from the set of training samples 102 and updates the estimator parameter values 122 of the data value estimator model 120 and the model parameter values 143 of the predictor model 142. Using the algorithm 400, for each training sample 102 (i.e., j) in the batch of training samples 102, the data value estimator model 120 calculates selection probabilities 106 and samples, using the sampler 130 selection values 132. The DVLR 110, for each training iteration (i.e., t), samples the batch of training samples 102, with respective selection probabilities 106 and selection values 132 indicating selection 310 and determines the performance measurements 144 (i.e., loss data). At the next step, the DVLR 110 updates the model parameter values 143 of the predictor model 142 based on the performance measurements 144 for the training iteration. The DVLR 110 next updates the estimator parameter values 122 of the data value estimator model 120 based on the performance measurements 144 for the training iteration including the moving average loss from the moving average loss calculator 146. At the final step, the DVLR updates the moving average loss in the moving average loss calculator 146.

Figure 5:
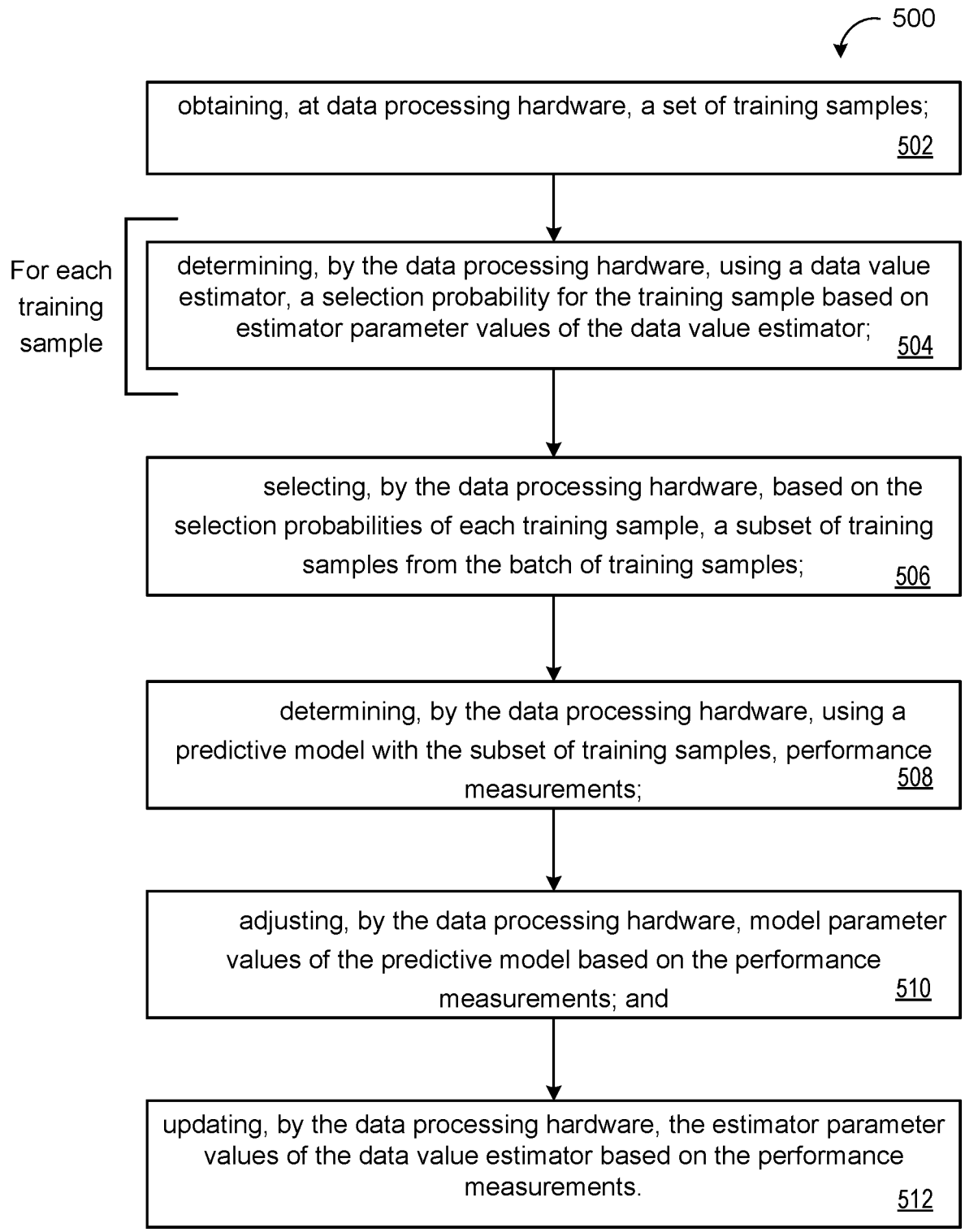
FIG. 5 is a flowchart of an example arrangement of operations for a method of data valuations using reinforcement learning.

FIG. 5 is a flowchart of an exemplary arrangement of operations for a method 500 for data valuation using reinforcement learning. The method 500, at operation 502, includes obtaining, at data processing hardware 12, a set of training samples 102. At operation 504, during each of a plurality of training iterations, the method 500 includes, for each training sample 102 in a batch of training samples 102, determining, by the data processing hardware 12, using a data value estimator 120, a selection probability 106 for the training sample 102 based on estimator parameter values of the data value estimator 120.

The method 500 includes, at operation 506, selecting, by the data processing hardware 12, based on the selection probabilities 106 of each training sample 102, a subset of training samples 102 from the batch of training samples 102. At operation 508, the method 500 includes determining, by the data processing hardware 12, using a predictor model 142 with the subset of training samples 102, performance measurements 144. The method 500 also includes, at operation 510, adjusting, by the data processing hardware 12, model parameter values 143 of the predictor model 142 based on the performance measurements 144. At operation 512, the method includes updating, by the data processing hardware 12, the estimator parameter values 122 of the data value estimator 120 based on the performance measurements 144.

Figure 6:
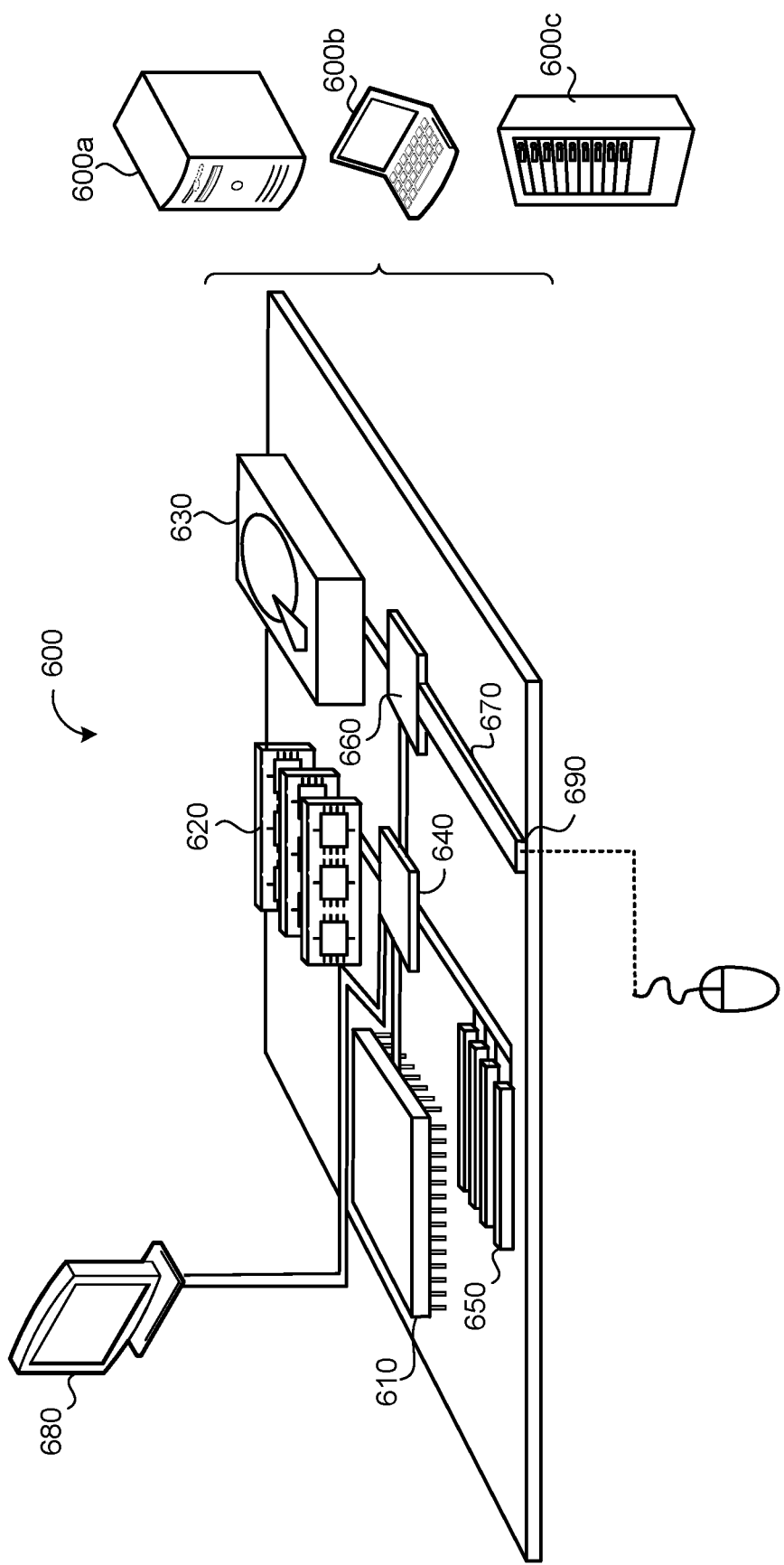
FIG. 6 is a schematic view of an example computing device that may be used to implement the systems and methods described herein.

FIG. 6 is schematic view of an example computing device 600 that may be used to implement the systems and methods described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610, memory 620, a storage device 630, a high-speed interface/controller 640 connecting to the memory 620 and high-speed expansion ports 650, and a low speed interface/controller 660 connecting to a low speed bus 670 and a storage device 630. Each of the components 610, 620, 630, 640, 650, and 660, are interconnected using various busses, and may be mounted on a common motherboard or in other manners as appropriate. The processor 610 can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and a low-speed expansion port 690. The low-speed expansion port 690, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600a or multiple times in a group of such servers 600a, as a laptop computer 600b, or as part of a rack server system 600c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method executed by data processing hardware that causes the data processing hardware to perform operations comprising:
    obtaining a batch of training samples;
    for each particular training sample in the batch of training samples, generating, using a data value estimator model and the particular training sample, a corresponding predicted value of the particular training sample when used to train a machine learning model;
    selecting, based on the corresponding predicted values, a subset of the batch of training samples;
    for each particular training sample in the subset of the batch of training samples, determining, using the machine learning model and the particular training sample, a corresponding prediction performance measurement; and
    adjusting one or more estimator parameter values of the data value estimator model based on the corresponding prediction performance measurements.

2. The method of claim 1, wherein determining the corresponding prediction performance measurement comprises determining loss data by a loss function.

3. The method of claim 2, wherein updating the one or more estimator parameter values of the data value estimator model based on the corresponding prediction performance measurements comprises:
    determining, from the loss data, a reinforcement signal; and
    updating the one or more estimator parameter values of the data value estimator model based on the reinforcement signal.

4. The method of claim 3, wherein updating the one or more estimator parameter values of the data value estimator model based on the reinforcement signal comprises:
    determining a reward value based on the loss data; and
    updating the one or more estimator parameter values of the data value estimator model based on the reward value.

5. The method of claim 4, wherein determining the reward value based on the loss data comprises:
    determining a moving average of the loss data based on N-most recent training iterations of the machine learning model;
    determining a difference between loss data for a most recent training iteration and the moving average; and
    determining the reward value based on the difference.

6. The method of claim 1, wherein:
    the data value estimator model comprises a neural network; and
    updating the one or more estimator parameter values of the data value estimator model comprises updating one or more layer parameter values of the neural network.

7. The method of claim 1, wherein selecting the subset of the batch of training samples comprises, for each particular training sample in the batch of training samples:
    determining, based on the corresponding predicted value, that a corresponding selection value indicates selection; and
    in response to determining that the corresponding selection value indicates selection, adding the particular training sample to the subset of the batch of training samples.

8. The method of claim 1, wherein the operations further comprise adjusting one or more predictor parameter values of the machine learning model based on the corresponding prediction performance measurements.

9. The method of claim 8, wherein adjusting the one or more predictor parameter values of the machine learning model comprises using a stochastic gradient descent.

10. The method of claim 1, wherein the operations further comprise sampling the batch of training samples from a set of training samples.

11. A system comprising:
    data processing hardware; and
    memory hardware in communication with the data processing hardware, the memory hardware storing instructions that when executed on the data processing hardware cause the data processing hardware to perform operations comprising:
        obtaining a batch of training samples;
        for each particular training sample in the batch of training samples, generating, using a data value estimator model and the particular training sample, a corresponding predicted value of the particular training sample when used to train a machine learning model;
        selecting, based on the corresponding predicted values, a subset of the batch of training samples;
        for each particular training sample in the subset of the batch of training samples, determining, using the machine learning model and the particular training sample, a corresponding prediction performance measurement; and
        adjusting one or more estimator parameter values of the data value estimator model based on the corresponding prediction performance measurements.

12. The system of claim 11, wherein determining the corresponding prediction performance measurement comprises determining loss data by a loss function.

13. The system of claim 12, wherein updating the one or more estimator parameter values of the data value estimator model based on the corresponding prediction performance measurements comprises:
    determining, from the loss data, a reinforcement signal; and
    updating the one or more estimator parameter values of the data value estimator model based on the reinforcement signal.

14. The system of claim 13, wherein updating the one or more estimator parameter values of the data value estimator model based on the reinforcement signal comprises:
    determining a reward value based on the loss data; and
    updating the one or more estimator parameter values of the data value estimator model based on the reward value.

15. The system of claim 14, wherein determining the reward value based on the loss data comprises:
    determining a moving average of the loss data based on N-most recent training iterations of the machine learning model;
    determining a difference between loss data for a most recent training iteration and the moving average; and
    determining the reward value based on the difference.

16. The system of claim 11, wherein:
    the data value estimator model comprises a neural network; and
    updating the one or more estimator parameter values of the data value estimator model comprises updating one or more layer parameter values of the neural network.

17. The system of claim 11, wherein selecting the subset of the batch of training samples comprises, for each particular training sample in the batch of training samples:
- determining, based on the corresponding predicted value, that a corresponding selection value indicates selection; and
- in response to determining that the corresponding selection value indicates selection, adding the particular training sample to the subset of the batch of training samples.

18. The system of claim 11, wherein the operations further comprise adjusting one or more predictor parameter values of the machine learning model based on the corresponding prediction performance measurements.

19. The system of claim 18, wherein adjusting the one or more predictor parameter values of the machine learning model comprises using a stochastic gradient descent.

20. The system of claim 11, wherein the operations further comprise sampling the batch of training samples from a set of training samples.

* * * * *